US009494131B2

(12) United States Patent
Fischer et al.

(10) Patent No.: US 9,494,131 B2
(45) Date of Patent: Nov. 15, 2016

(54) MONOPILE FOUNDATION FOR OFFSHORE WIND TURBINE (75) Inventors: Torsten Fischer, Ringkøbing (DK); Anders Søe-Jensen, Farum (DK)

(73) Assignee: Vestas Wind Systems A/S, Aarhus N (DK)

( * ) Notice: Subject to any disclaimer, the term of this patent is extended or adjusted under 35 U.S.C. 154(b) by 1200 days.

(21) Appl. No.: 12/675,022

(22) PCT Filed: Aug. 27, 2008

(86) PCT No.: PCT/DK2008/050212
§ 371 (c)(1),
(2), (4) Date: Sep. 27, 2010

(87) PCT Pub. No.: WO2009/026933
PCT Pub. Date: Mar. 5, 2009

(65) Prior Publication Data
US 2011/0006538 A1  Jan. 13, 2011

Related U.S. Application Data (60) Provisional application No. 60/966,863, filed on Aug. 30, 2007.

(30) Foreign Application Priority Data

Aug. 29, 2007 (DK) .................. 2007 01235

(51) Int. Cl.
*E04C 3/30* (2006.01)
*E04H 12/34* (2006.01)
(Continued)

(52) U.S. Cl.
CPC ............... *F03D 1/001* (2013.01); *F03D 13/22* (2016.05); *E02B 2017/0091* (2013.01);
(Continued)

(58) Field of Classification Search
CPC ................... E04H 12/34; E04H 12/342; E04H 12/00; E04H 12/12; E04H 12/20;
(Continued)

(56) References Cited

U.S. PATENT DOCUMENTS 125,771 A * 4/1872 Trego ......................... 52/651.02
476,889 A * 6/1892 Meyer et al. ............... 174/45 R
(Continued)

FOREIGN PATENT DOCUMENTS

EP    1 770 276    4/2007
EP    1 867 790    12/2007
(Continued)

OTHER PUBLICATIONS

F. Criado Jimenez; International Search Report and Written Opinion issued in related PCT patent application No. PCT/DK2008/050212; Nov. 26, 2008; 12 pages; European Patent Office.
(Continued)

*Primary Examiner* — Phi A
(74) *Attorney, Agent, or Firm* — Wood Herron & Evans LLP (57) ABSTRACT A method for installing a wind turbine comprises establishing a substructure, the substructure comprising at least one pile extending upwards and the at least one pile being part of a primary structure of the substructure, establishing a support of a secondary structure on the at least one pile, mounting of fittings to the secondary structure, the mounting of the fittings to the secondary structure preferably being established by welding or bolting, and not mounting fittings to at least one of the at least one pile being part of the primary structure. A method may alternatively comprise mounting a wind turbine tower to the at least one pile being part of the primary structure, and the secondary structure constituting an intermediate structure between the at least (Continued)

one pile and the wind turbine tower. Even in the alternative, a method may comprise the mounting of the secondary structure to at least one intermediate tubular section being part of the primary structure and mounting the wind turbine tower to the at least one intermediate tubular section.

31 Claims, 2 Drawing Sheets (51) Int. Cl.
    *F03D 1/00* (2006.01)
    *E02B 17/00* (2006.01)
(52) U.S. Cl.
    CPC ............... *E04C 3/30* (2013.01); *E04H 12/34* (2013.01); *E04H 12/342* (2013.01); *F05B 2240/912* (2013.01); *F05B 2240/913* (2013.01); *F05B 2240/95* (2013.01); *Y02E 10/727* (2013.01); *Y02E 10/728* (2013.01)
(58) Field of Classification Search
    CPC ............. E04B 1/34326; E04B 1/34384; E04B 1/343; E04C 3/30; E04C 3/36
    USPC ............... 52/651.01, 651.07, 40, 146, 110, 52/651.02, 651.03, 651.04, 651.08, 836; 343/890, 891, 892; 248/127, 158; 405/204, 203, 224
    See application file for complete search history.

(56) References Cited

U.S. PATENT DOCUMENTS

| | | | | |
|---|---|---|---|---|
| 546,710 | A * | 9/1895 | Rogers | 74/103 |
| 1,786,631 | A * | 12/1930 | Roe | 52/223.5 |
| 2,357,046 | A * | 8/1944 | Hewitt | 297/461 |
| 2,698,873 | A * | 1/1955 | Allsworth et al. | 174/45 R |
| 2,784,556 | A * | 3/1957 | Perdue | F03D 1/00 290/5 |
| 2,901,890 | A * | 9/1959 | Hutchison | 405/224 |
| 3,110,368 | A * | 11/1963 | Ross | 52/148 |
| 3,371,458 | A * | 3/1968 | Sturgill | 52/651.01 |
| 3,412,813 | A * | 11/1968 | Johnson | 173/141 |
| 3,768,016 | A * | 10/1973 | Townsend et al. | 455/25 |
| 3,934,658 | A * | 1/1976 | Nelson | 175/7 |
| 4,248,549 | A * | 2/1981 | Czerewaty | 405/224 |
| 4,589,802 | A * | 5/1986 | Hampton | 405/227 |
| 4,654,612 | A * | 3/1987 | Smith | 333/248 |
| 4,687,380 | A * | 8/1987 | Meek et al. | 405/204 |
| 4,800,690 | A * | 1/1989 | Bunce | E04H 12/20 110/184 |
| 4,934,114 | A * | 6/1990 | Lindsey | 52/40 |
| 6,249,261 | B1 * | 6/2001 | Solberg et al. | 343/801 |
| 6,513,299 | B1 * | 2/2003 | Damiano | 52/651.02 |
| 6,888,264 | B1 * | 5/2005 | Willis | F03D 1/001 290/44 |
| 7,059,095 | B1 * | 6/2006 | Stevens et al. | 52/651.01 |
| 7,198,453 | B2 | 4/2007 | Hall | |
| 7,321,340 | B1 * | 1/2008 | Sergi et al. | 343/890 |
| 7,413,365 | B2 * | 8/2008 | Kreller | 403/49 |
| 7,516,590 | B2 * | 4/2009 | Brinkmann | 52/651.01 |
| 7,735,290 | B2 * | 6/2010 | Arsene | 52/651.01 |
| 7,993,107 | B2 * | 8/2011 | Gevers | 416/244 R |
| 8,191,316 | B2 * | 6/2012 | Kristensen | 52/40 |
| 8,302,365 | B2 * | 11/2012 | Gee | 52/745.17 |
| 8,418,413 | B2 * | 4/2013 | Marmo et al. | 52/167.4 |
| 8,578,681 | B2 * | 11/2013 | Patterson | F03D 11/045 403/292 |
| 8,713,896 | B2 * | 5/2014 | Willis | E04H 12/08 52/651.01 |
| 2001/0013212 | A1 * | 8/2001 | Jimenez Sanchez et al. | 52/736.1 |
| 2003/0112197 | A1 * | 6/2003 | Skalina et al. | 343/770 |
| 2003/0205021 | A1 * | 11/2003 | Ryan | E04C 3/30 52/834 |
| 2004/0169376 | A1 * | 9/2004 | Ruer et al. | 290/55 |
| 2007/0025816 | A1 | 2/2007 | Baber et al. | |
| 2012/0131876 | A1 * | 5/2012 | Nies | 52/651.01 |

FOREIGN PATENT DOCUMENTS

| | | |
|---|---|---|
| GB | 2 437 533 | 10/2007 |
| JP | 2005232747 | 9/2005 |
| JP | 2007-092406 | 4/2007 |
| WO | 2005/005752 | 1/2005 |
| WO | 2006/024244 | 3/2006 |

OTHER PUBLICATIONS

Andreas Wagner et al.; Offshore Wind: Utgrunden leads the way; Modern Power Systems; Oct. 2001; Enron Wind GmbH, Salzbergen, Germany.

John Eggers Fohlmann; Danish Examination Report issued in related Danish Patent Application No. PA 2007 01235; Apr. 11, 2008; 7 pages; Denmark Patent and Trademark Office.

* cited by examiner

MONOPILE FOUNDATION FOR OFFSHORE WIND TURBINE

Cross-Reference to Related Applications

This application claims priority under 35 U.S.C. §119(a) to DK Application No. PA 2007 01235, filed Aug. 29, 2007. This application also claims the benefit of U.S. Provisional Application No. 60/966,863, filed Aug. 30, 2007. Each of these applications is incorporated by reference herein in its entirety.

FIELD OF THE INVENTION

The invention relates to a pile substructure being part of a primary structure of a wind turbine foundation, and preferably with welded flange connections, and installed in soft soils by driving with an impact hammer or by vibrating with a vibrator. Due to high installation loads during pile driving or vibration, it is not possible to pre-install attachments to the foundation like boat-landings, access ladders, platforms, J/I-tubes, cranes, navigation aids, cathodic protection system etc., all being elements of a secondary structure of a wind turbine plant.

BACKGROUND OF THE INVENTION

Substructures comprising one or more piles, either constituted by tubular sections or constituted by solid sections or even constituted by a combination of tubular sections and solid sections, also known as piled foundation, are known, mostly for establishing a foundation for wind turbines at sea, i.e. offshore. Such substructure consists of a primary structure and a secondary structure.

The primary structure is the structure performing load-bearing of the wind turbine itself. The primary structure is also the structure taking up loads of a magnitude comparable to the load of the wind turbine itself such as loads from waves, sea currents, earth tremors and other sea or ground-induced loads, loads from bending torques by the wind on the rotor of the wind turbine or loads from avalanches, stone slides or other such environmental loads.

The secondary structure is not performing load-bearing of the wind turbine itself or of the other loads mentioned above. The secondary structure is performing load-bearing of different servicing equipment to be used during installation of the foundation of the wind turbine and to be used during the operational life-time of the wind turbine. Such equipment may be boat-landings, access ladders, platforms, J/I-tubes, cranes, navigation aids, cathodic protection system, etc.

Secondary structures are mounted to the one or more tubular sections by means of fittings such as doubler plates. The fittings are often welded to the tubular section. Welding to the tubular section is time-consuming, but may also be devastating to the mechanical integrity of the foundation, both during establishment of the foundation and during the subsequent service life of the foundation.

Another known solution incorporates a mono-pile with a grouted transition piece. The transition piece is part of the primary structure. All secondary structures are welded or mounted to the transition piece. However, disadvantages of such a known solution are numerous. An additional lift for the transition piece is needed during installation. In case of deep water, either below water attachments (for e.g. J/I-tubes and cathodic protection system) must be attached to the mono-pile after driving the mono-pile into the ground, which involves expensive diver work and requires doubler plates welded to the mono-pile, or the transition piece must be extended to the seabed which increases the risk of a failing grout sealing. The grouted connection must be hardened before the wind turbine can be installed, which may take several days.

Therefore, the number of fittings such as doubler plates and the position of the fittings and the welding seams of such fittings have to be carefully selected, dimensioned and established in order to avoid impediment of the mechanical integrity of the tubular section. On the other hand, the fittings must be positioned so that the fittings are capable of supporting the secondary structure at the right level, at a sufficient basis and at locations where access to the fittings is possible.

U.S. Pat. No. 7,198,453 discloses a pile-based structural support device including a number of legs used to support a wind turbine. The wind turbine includes a base, a turbine generator and a blade mechanism. The legs are configured in a tee-pee type configuration such that the footprint of the base is larger than the footprint of the opposing end. This structural support can be used as a base for an offshore platform in that the support reduces the lateral forces on the support caused by wave action. Fittings are mounted to the legs of the tee-pee type configuration.

EP 1 770 276 discloses a method for installing an offshore wind turbine system which includes driving a cylindrical annular mono-pile into the ground. The mono-pile includes a flanged portion configured to support a wind turbine tower. The flanged portion extends radially from a peripheral surface of the mono-pile. The method further includes mounting a wind turbine tower directly onto the mono-pile, and the wind turbine is supported by the flanged portion of the mono-pile. No secondary structures are shown as being part of the foundation.

Thus, unfortunately, design and material considerations cannot be excluded regarding fittings being mounted to the tubular section, preferably by welding.

Also, when mounting the secondary structure to the tubular section, there is a risk of damage to any coating such as anti-corrosive paint on the tubular section.

SUMMARY OF THE INVENTION

It may be seen as an object of the invention to establish a substructure for a wind turbine tower, where the dimensions and/or the choice of material may be optimised without compromising the mechanical integrity of the substructure. It may also be seen as an object of the invention to provide a method for installing a substructure, where time and effort in installing the substructure is reduced.

Thus, it may be seen as an overall object of the invention to provide a substructure and a method for installing a substructure which individually or in combination reduces the costs of establishing a substructure for a wind turbine.

The above-mentioned objects may be obtained by a method comprising the steps of mounting fittings to the secondary structure, the mounting of fittings to the secondary structure preferably being established by welding or bolting, most preferred above sea water level if the substructure is to be mounted at sea, and not mounting fittings to the pile being part of the primary structure, at least decreasing the number of fittings and/or decreasing the damage to the mechanical integrity and thus to the strength and durability of the primary structure when mounting of fittings to the primary structure by means of fixation means involves mechanical or thermally induced material bonding of the pile.

By decreasing the number of fittings and/or decreasing the damage to the mechanical integrity and thus to the strength and durability of the primary structure when mounting fittings to the primary structure, design and material considerations may be totally left out regarding the mechanical integrity of the pile, apart from considerations regarding pure mechanical stress induced during driving or vibrating the pile and considerations regarding pure mechanical stress during operation of the wind turbine. Considerations regarding fatigue-induced stress are very limited.

The above-mentioned objects may also be obtained by a method comprising the step of mounting fittings to the secondary structure, the mounting of fittings to the secondary structure being established by mechanical working such as forming holes for bolts or rivets or by thermally induced material bonding, and mounting the wind turbine tower to the primary structure, and mounting the secondary structure so as to constitute an intermediate structure between the pile and the wind turbine tower.

Alternatively to mounting the secondary structure so as to constitute an intermediate structure, the secondary structure may be mounted so as to constitute a structure which is physically separate from the primary structure. Thus, the secondary structure will be supported by the primary structure without being physically fastened to the primary structure, i.e. without being attached to the primary structure by bolts, rivets, welding or the like fastening means.

The secondary structure constituting an intermediate structure results in the secondary structure being capable of being supported by the pile without the need for welding, bolting, riveting or grouting the secondary structure to the pile. The secondary structure is at least merely supported by the pile, and perhaps the secondary structure is also mounted to the pile, however without welding being needed for mounting.

By merely supporting, and possibly mounting, the secondary structure to the pile, design and material considerations may be totally left out regarding the mechanical integrity of the pile, apart from considerations regarding pure mechanical stress induced during driving or vibrating the pile and considerations regarding pure mechanical stress during operation of the wind turbine. Considerations regarding fatigue-induced stress are not necessary, or at least considerations regarding fatigue-induced stress are very limited.

According to a preferred method according to the invention of establishing the substructure, a support of a secondary structure on the pile is established, preferably by downwards sliding of the secondary structure along the pile. Sliding is terminated when the secondary structure is supported on the pile, either on the very top of the pile, or along an upwards extending part of the pile, or at both locations of support.

During sliding of the secondary structure, a gap is present between an inner circumference of the secondary structure and an outer circumference of the pile. The gap is preferably at least 50 mm, even preferred at least 100 mm, possibly at least 150 mm. By establishing a large gap between the secondary structure and the pile during sliding, the risk of mutual scratching between the two is eliminated or at least the risk is highly reduced.

A substructure according to the present invention is characterised by a secondary structure comprising a support element for supporting, and preferably for mounting, the secondary structure to the pile, and the substructure furthermore comprises fittings for mounting additional structures to the substructure, and where at least most, preferably all, of the fittings are attached to the secondary structure by means of mechanical fastening such as bolts and nuts or rivets or by means of material bonding such as welding or grouting.

By not having fittings on the pile being part of the primary structure, design and material considerations may be totally left out regarding the mechanical integrity of the pile, apart from considerations regarding pure mechanical stress induced during driving or vibrating the pile and considerations regarding pure mechanical stress during operation of the wind turbine. Considerations regarding fatigue-induced stress are not necessary, or at least considerations regarding fatigue-induced stress are very limited.

According to a possible embodiment of the secondary structure, the supporting element of the secondary structure is a flange, the flange extending between a top flange of the pile and a bottom flange of the wind turbine tower, the flange of the secondary structure being positioned intermediate the top flange of the pile and the bottom flange of the wind turbine tower, when the wind turbine tower is mounted to the substructure.

A flange being the support element of the secondary structure enables the supporting structure to easily be supported by the pile. If the flange of the secondary structure corresponds to the top flange of the tubular structure and the bottom flange of the wind turbine tower, the flange of the secondary structure may be mounted to the substructure by the same bolts and nuts used for mounting the wind turbine tower to the pile.

According to the invention, the substructure may alternatively comprise a support element of the secondary structure being an intermediate tubular section, the intermediate tubular section extending between the pile and the wind turbine tower, the intermediate tubular alternative section being part of the wind turbine tower, when the wind turbine tower is mounted to the substructure.

An intermediate tubular section may be, and often will be, part of the primary structure and thus have to fulfill the harsh design and material conditions of a primary structure. However, still the pile, i.e. not the intermediate tubular section, but the pile to be driven or vibrated into the ground, may be void of any fittings and secondary structures.

Therefore, design and material considerations may still be totally left out regarding the mechanical integrity of the pile, apart from considerations regarding pure mechanical stress induced during driving or vibrating the pile and considerations regarding pure mechanical stress during operation of the wind turbine. Considerations regarding fatigue-induced stress are not necessary, or at least considerations regarding fatigue-induced stress are very limited.

An advantage of an intermediate tubular section compared to a supporting element such as a flange of the secondary structure, as previously mentioned, is amongst other advantages that the switch gear, ground controller or other equipment can be pre-installed in the intermediate tubular section. Switch gear, ground controller and other equipment are protected against bad weather by an internal platform on top. This platform is also used during tower installation.

This advantage then results in the further advantage that the power cable can be installed directly after substructure installation. All cable work can be ready before turbine installation. All navigation aids and other electrical equipment installed on the substructure can be pre-installed, pre-connected to the ground controller and tested onshore. This makes the actual wind turbine installation faster.

According to a first possible embodiment of the intermediate tubular section, of the pile and of the wind turbine tower, the intermediate tubular section has a bottom flange being mounted to a top flange of the pile, and the intermediate tubular section also has a top flange onto which a bottom flange of the wind turbine tower is mounted, when the wind turbine tower is mounted to the substructure.

Flanges, both for mounting the bottom of intermediate tubular section to the top of the pile to be driven or vibrated into the ground, and for mounting the bottom of the wind turbine tower to the top of the intermediate tubular section, establishes a well-known method of mutually mounting the individual parts of the wind turbine, preferably by bolts and nuts.

Flanges for mounting the bottom of the intermediate tubular section to the top of the pile to be driven or vibrated into the ground, or for mounting the top of the intermediate tubular section to the bottom of the wind turbine tower, establishes a well-known method of mutually mounting the individual parts of the wind turbine, preferably by bolts and nuts.

According to an aspect of the invention, at least a section of the secondary structure extends downwards along the upwards extending part of the pile of the substructure, and the section of the secondary structure is supported laterally on an outer circumference of the pile by means of laterally supporting elements, the laterally supporting elements constituting friction-reducing elements between the downwards extending section of the secondary structure and the upwards extending part of the pile.

Friction-reducing elements laterally supporting a downwards extending section of the secondary structure against the upwards extending pile, result in a reduced risk of corrosion or other mechanical damage to the pile and to the secondary structure, after the secondary structure having been slid down along the pile. Any coating on the pile may be kept intact, even though sliding of the secondary structure along the pile results in a mutual abutment between the secondary structure and the pile.

According to another aspect of the invention, where a downwards extending section of the secondary structure is extending along an upwards extending part of the tubular structure, at least one clamp is provided along at least part of an inner circumference of said section of the secondary structure, said clamp being tightened in order to laterally secure the downwards extending section of the secondary structure to the outer circumference of the pile.

According to a first possible embodiment of the friction-reducing elements, the friction-reducing elements are a plurality of substantially elastomeric elements extending between at least part of the outer circumference of the pile and at least part of the inner circumference of the secondary structure.

According to a second possible embodiment of the friction-reducing elements, the friction-reducing elements are a plurality of substantially rigid elements extending between at least part of the outer circumference of the pile and at least part of the inner circumference of the secondary structure.

According to a third possible embodiment of the friction-reducing elements, the friction-reducing elements are a plurality of substantially vertically rolling elements extending between at least part of the outer circumference of the pile and at least part of the inner circumference of the secondary structure.

According to a fourth possible embodiment of the friction-reducing elements, the friction-reducing elements are a plurality of beads or labial-like elements or tongue-like elements extending between at least part of the outer circumference of the pile and at least part of the inner circumference of the secondary structure.

The different possible embodiments of friction-reducing elements all have individual advantages. The elastomeric elements are very resilient and will to a great extent reduce the risk of damage to the coating on the pile. The rigid elements will to a lesser extent reduce the risk of damage to the coating on the pile, but may be more durable during sliding of the secondary structure and possibly also during the operational lifetime of the wind turbine. Vertically rolling elements will to a very great extent reduce the risk of damage to the coating on the pile, but may be less durable at least during the operational lifetime of the wind turbine. A plurality of beads or labial-like elements or tongue-like elements may be formed and the material chosen so that durability and friction reduction are optimised during sliding of the secondary structure, but also so that durability during the operational lifetime of the wind turbine is optimised as well, or at least so that durability both during sliding and during the operational lifetime of the wind turbine is maximised.

According to another aspect of the invention, where a downwards extending section of the secondary structure is extending along an upwards extending part of the tubular structure, at least one clamp is provided along at least part of an inner circumference of the section of the secondary structure, the clamp being tightened in order to laterally secure the downwards extending section of the secondary structure to the outer circumference of the pile.

A clamp for tightening the secondary structure around the pile is an easy and safe way of laterally securing the two structures together. The durability of such clamp during the operational lifetime of the wind turbine may be excessive. The possibility of still providing friction-reducing elements between the secondary structure and the pile ensures that coating of the tubular structure may be kept undamaged, both during sliding of the secondary structure along the pile and during the operational lifetime of the wind turbine.

Summarizing, implementing one or more aspects of the present invention involves different advantages regarding technology, function and economy.

Functionally and economically, substructure establishment is fast and easy, possibly only involving two lifts by crane. Grouted connections may be omitted in some cases, e.g. in case of rubber rollers. The substructure is ready for turbine tower installation directly after driving or vibrating of the mono-pile. The substructure is ready for installation of secondary structure frame with all attachments. There is no need for electrical connection of a cathodic protection system below sea level. All electrical equipment like, for example, navigation equipment may be pre-installed and pre-connected to ground controller. All in all, offshore installation time is reduced significantly and a need for divers is eliminated.

Technically, the pile may be manufactured with decreased wall thickness, as no Stress Concentration Factors (SCFs) have to be applied for welded or bolted fittings, such as doubler plates. Vibrating the pile into the ground, instead of driving it into the ground, can further reduce the fatigue damages during installation, which results in further reduction of wall thickness. Uncoupling of power cable and turbine installation process results in a decreased risk of delays during establishment of the substructure and during subsequent servicing. Larger ships are capable of boat-landing due to the possibility of reducing ship impact on the pile.

BRIEF DESCRIPTION OF THE DRAWINGS

The invention will hereafter be described with reference to the drawings, where.

DETAILED DESCRIPTION OF THE INVENTION

Figure 1:
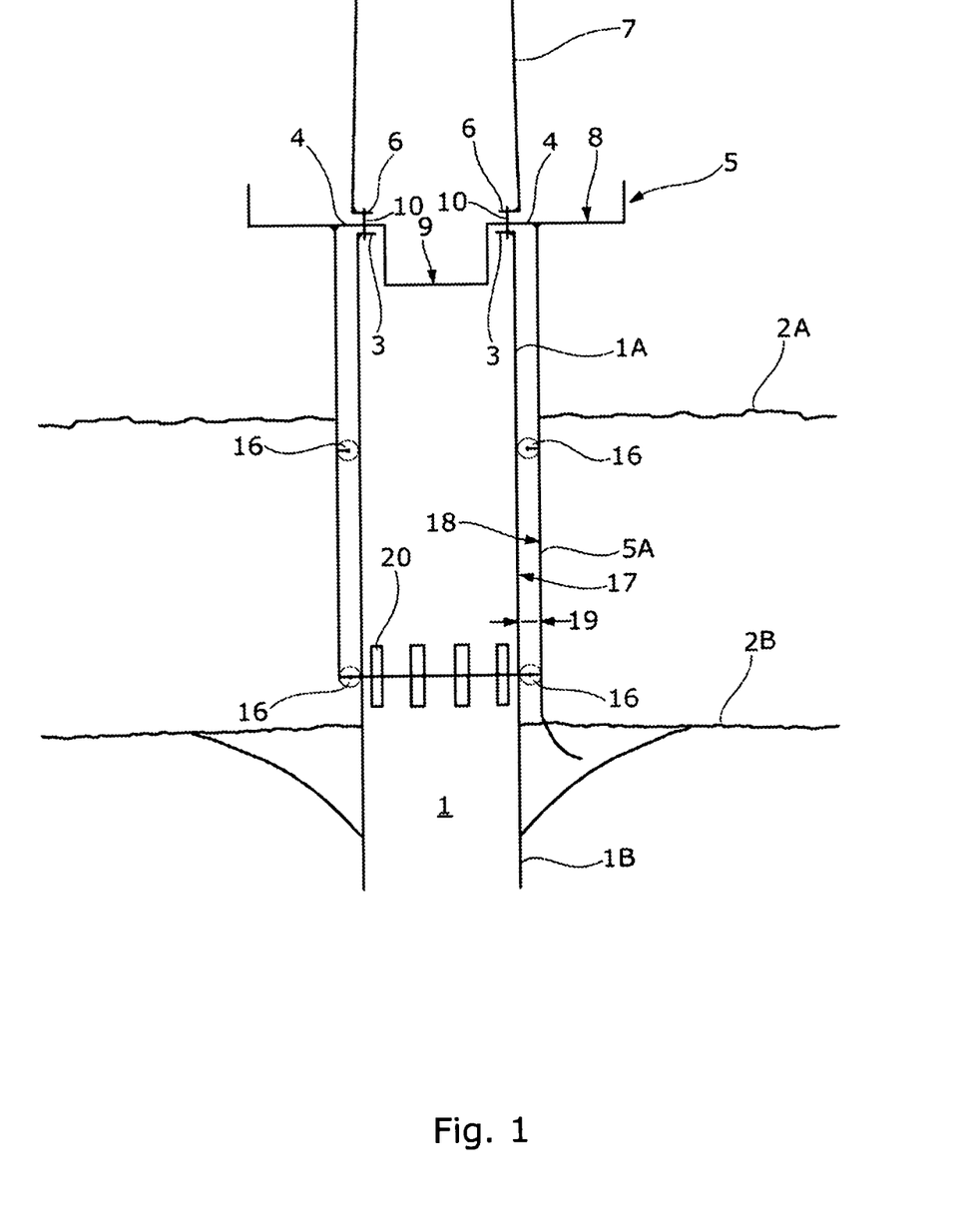
FIG. 1 is a sketch of a first possible embodiment of a substructure and illustrates a first possible method of establishing a substructure according to the invention.

FIG. 1 is a sketch showing a possible first embodiment of a substructure for a wind turbine. The substructure comprises a pile 1 known as a mono-pile. A bottom section 1B of the mono-pile is partly embedded in the ground 2B, possibly a sea-bed. A top section 1A of the mono-pile is extending above ground and above a possible sea level 2A and is intended for supporting the whole wind turbine and any equipment necessary for mounting and subsequently servicing the wind turbine.

Figure 2:
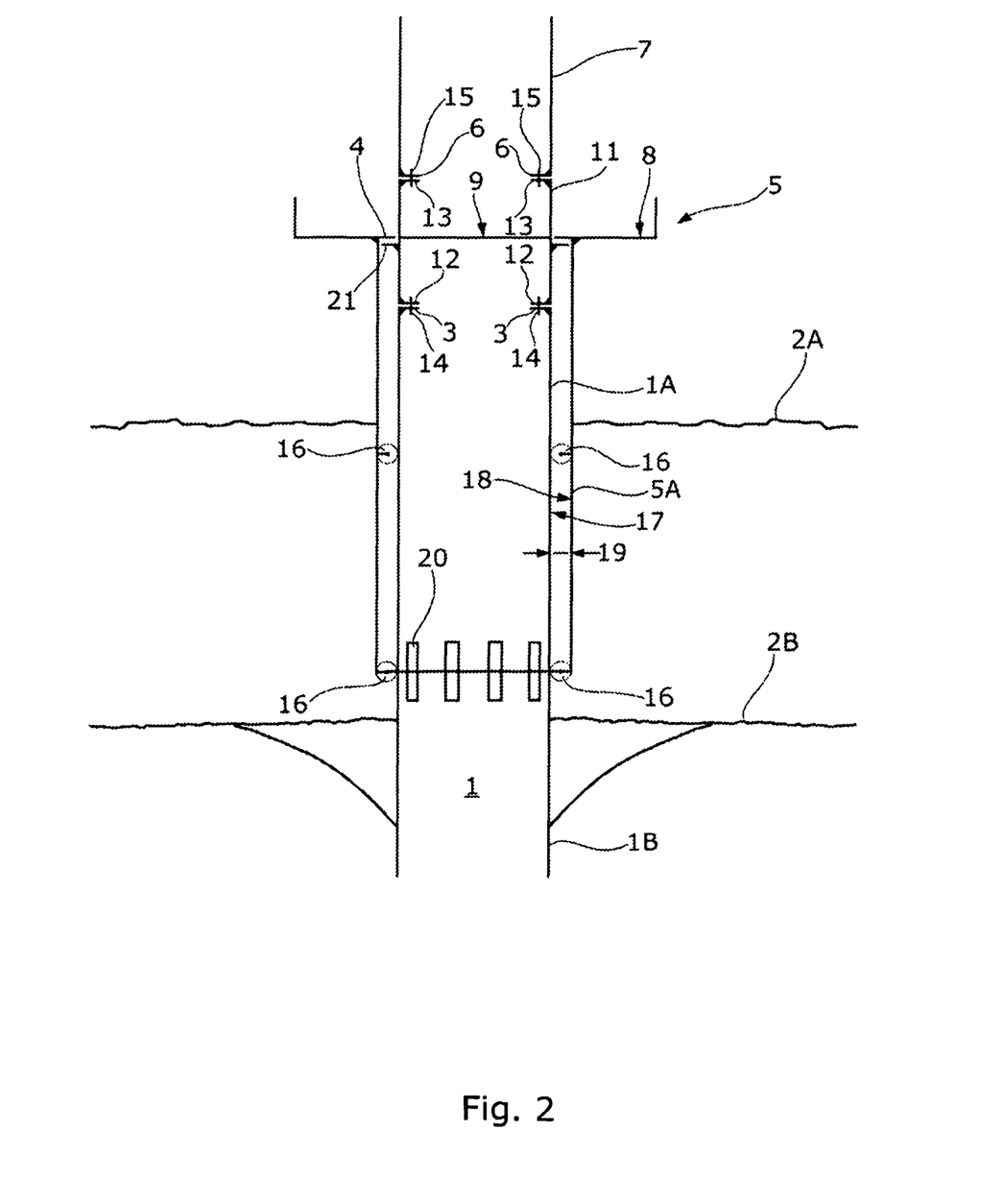
FIG. 2 is a sketch of a second possible embodiment of a substructure and illustrates a second possible method of establishing a substructure according to the invention.

In the embodiments shown in the figure, the pile 1 is shown to be a mono-pile. Alternatively, more than one pile may be used for establishing the substructure, e.g. three or more piles forming a tee-pee-like substructure. Furthermore, in the embodiments shown in the figures, the pile is shown to be a hollow tubular pile made of steel. Alternatively, the pile may be a solid pile, e.g. made of concrete. Even in the alternative, the pile may be a hollow tubular pile made from another material than steel, e.g. made of concrete.

In the remainder of the detailed description of embodiments of the invention, a tubular pile made of steel will be used as example of a pile for the substructure.

The mono-pile 1 constitutes a primary structure of the substructure. A primary structure of a substructure for a wind turbine is the structure performing load-bearing of the wind turbine itself including the wind turbine tower. A substructure incorporating a mono-pile 1 is preferably intended for offshore installation, where access to the ground 2B is difficult due to the ground being submerged below sea level 2A. The mono-pile is intended for being driven or vibrated into the ground, preferably into a sea bed, as an initial method step of establishing the substructure for the wind turbine.

In the embodiment shown, the mono-pile 1 is provided with a flange 3 on top of the mono-pile. The flange 3 is extending along an entire circumference of the mono-pile 1 and along an inner periphery of the mono-pile. The top flange 3 of the mono-pile is intended for supporting a corresponding flange 4 of a secondary structure 5 to be at least supported on, preferably being mounted to, the mono-pile 1 and also supporting a bottom flange 6 of the wind turbine tower 7 to be mounted on the substructure.

When establishing the substructure, the bottom section 1B of the mono-pile 1 is initially driven or vibrated into the ground 2B. Subsequently, the secondary structure 5 is mounted onto the top flange 3 of the mono-pile 1. The secondary structure 5 does not constitute part of the load-bearing structure of the substructure. The secondary structure 5 is thus supported by the mono-pile 1 without the mono-pile 1 being equipped with special elements such as doubler plates being welded onto the mono-pile 1.

In the embodiment shown, the secondary structure 5 comprises a main section consisting of an outer access platform 8 and an inner service platform 9. The outer access platform 8 is intended as an access platform during the operational lifetime of the wind turbine. The inner service platform 9 is primarily intended as a service platform during installation of the wind turbine, e.g. the inner service platform 9 is intended as a platform for service personnel during mounting and tightening of bolts and nuts for mutually connecting the mono-pile 1 and the wind turbine tower 7.

After the substructure having been established, and after the wind turbine tower 7 having been mounted to the mono-pile 1, and during the subsequent operational lifetime of the wind turbine, the inner service platform 9 may serve as a platform during maintenance and/or control of the bolts and nuts mutually connecting the mono-pile 1 and the wind turbine tower 7. In the embodiment shown, the outer access platform 8 and the inner service platform 9 constitute elements of the one and same mechanical structure.

After the mono-pile 1 having been driven or vibrated into the ground 2B, the main section of the secondary structure 5 is hoisted by a crane and is lowered down toward the top of the mono-pile 1 and is supported on the top flange 3 of the mono-pile.

When finalising establishment of the substructure, the wind turbine tower 7 is finally mounted to the top flange 3 of the mono-pile 1. Before that, as mentioned above, the main section of the secondary structure 5 is already being supported by the top flange 3 of the mono-pile 1. The wind turbine tower is thus supported by the top flange 3 of the mono-pile 1 with the main section of the secondary structure 5 already being supported.

The main section of the secondary structure may have a flange 4 to be supported by the top flange 3 of the mono-pile 1. The flange 4 of the secondary structure 5 may have holes for the bolts 10 for mounting the wind turbine tower 7 to the mono-pile 1, the holes of the flange 4 of the secondary structure 5 matching the holes of in the top flange 3 of the mono-pile 1 and corresponding holes of the bottom flange 6 of the wind turbine tower 7. Thus, the bolts 10 for mounting the wind turbine tower 7 to the top of the mono-pile 1 will pass through the holes in the flange 4 of the secondary structure 5.

Alternatively, the secondary structure 5 may be supported on the top flange 3 of the mono-pile 1 along circumferential sections of the top flange 3 of the mono-pile 1, at locations where possibly no holes are provided in the top flange 3 of the mono-pile 1. Thus, the bolts 10 for mounting the wind turbine tower 7 to the top of the mono-pile 1 will pass by the locations where the secondary structure 5 is supported on the mono-pile 1.

FIG. 2 is a sketch showing a possible second embodiment of a substructure for a wind turbine. Similar to the substructure shown in FIG. 1, the substructure comprises a mono-pile 1. A bottom section 1B of the mono-pile is partly embedded in the ground 2B, possibly a sea-bed. A top section 1A of the mono-pile is extending above ground 2B and above a possible sea level 2A and is intended for supporting the whole wind turbine and any equipment necessary for mounting and subsequently servicing the wind turbine.

The mono-pile 1 constitutes a primary structure of the substructure. As mentioned, a primary structure of a substructure for a wind turbine is the structure performing load-bearing of the wind turbine itself including the wind turbine tower. A substructure incorporating a mono-pile is preferably intended for offshore installation, where access to the ground is difficult due to the ground being sub-merged below sea level 2A. The mono-pile is intended for being driven or vibrated into the ground, preferably into a sea bed, as an initial method step of establishing the substructure for the wind turbine.

In the embodiment shown, the mono-pile 1 is provided with a flange 3 on the top of the mono-pile 1. The flange 3 is extending along an entire circumference of the mono-pile 1 and along an inner periphery of the mono-pile 1. The flange 3 is intended only for supporting a corresponding bottom flange 12 of an intermediate tubular section 11 to be at least supported on, preferably being mounted to, the mono-pile 1. The intermediate tubular section 11 is constituted by a tubular section extending upwards in prolongation of the mono-pile 1.

When establishing the substructure, the mono-pile 1 is initially driven or vibrated into the ground 2B. Subsequently, the intermediate tubular section 11 is mounted onto the flange 3 on the top of the mono-pile 1. The intermediate tubular section 11 is thus supported by the mono-pile 1 without the mono-pile 1 being equipped with special elements such as doubler plates welded onto the mono-pile 1. The intermediate tubular section 11 constitutes part of the load-bearing structure of the substructure.

In the embodiment shown, a secondary structure 5 comprises a main section consisting of an outer access platform 8 and an inner service platform 9. The outer access platform 8 and the inner service platform 9 are both supported by the intermediate tubular section 11 constituted by a tubular section extending upwards in prolongation of the mono-pile 1. The outer access platform 8 is supported by the intermediate tubular section 11 along a flange 21 of the section 11 and by means of the flange 4 of the secondary structure 5.

The outer access platform 8 is intended as access platform during the operational lifetime of the wind turbine. The inner service platform 9 is primarily intended as service platform during installation of the wind turbine, e.g. the inner service platform 9 is intended as platform for service personnel during mounting and tightening of bolts and nuts for connecting the intermediate tubular section 11 to the mono-pile 1 and to the wind turbine tower 7, respectively.

After the substructure having been established and after the wind turbine having been mounted to the mono-pile 1 via the intermediate tubular section 11, and during the subsequent operational lifetime of the wind turbine, the inner service platform 9 may serve as platform during maintenance and/or control of the bolts and nuts. In the embodiment shown, the outer access platform 8, the inner service platform 9 and the intermediate tubular section 11 constitute elements of the one and same mechanical structure.

After the mono-pile 1 having been driven or vibrated into the ground 2B, the intermediate tubular section 11 is hoisted by a crane and is lowered down towards the top of the mono-pile 1 and is supported on the top flange 3 of the mono-pile 1.

The intermediate tublar section 11 has a bottom flange 12 to be supported by the top flange 3 of the mono-pile. The bottom flange 12 of the intermediate tublar section 11 will have holes for bolts 14 matching the holes of the top flange 3 of the mono-pile 1. Thus, bolts 14 for mounting the intermediate tublar section 11 to the top of the mono-pile 1 will pass through both the holes in the top flange 3 of the mono-pile 1 and through the corresponding holes of the bottom flange 12 of the intermediate tublar section.

The intermediate tubular section 11 also has a top flange 13 for supporting a flange 6 at the bottom of the wind turbine tower 7. The top flange 13 of the intermediate tubular section 11 will have holes for bolts 15 for mounting the wind turbine tower 7 to the intermediate tubular section 11, the holes matching holes of the bottom flange 6 of the wind turbine tower 7. Thus, the bolts 15 for mounting the wind turbine tower 7 to the intermediate tubular section 11 will pass through both the holes in the flange 6 at the bottom of the wind turbine tower 7 and through the corresponding holes of the top flange 13 of the intermediate tubular section 11.

When finalising establishment of the substructure, the wind turbine tower 7 will finally be mounted onto the top flange 13 of the intermediate tubular section 11. Before that, as mentioned above, the intermediate tubular section 11 is already being supported by the top flange 3 of the mono-pile 1. The wind turbine tower 7 is thus mounted to the top flange 13 of the intermediate tubular section 11 with the bottom flange 12 of the intermediate tubular section 11 already being mounted to the top flange 3 of the mono-pile 1. Alternatively, the bottom flange 12 of the intermediate tubular section may be mounted to the top flange 3 of the mono-pile 1 with the wind turbine tower 7 already being mounted to the top flange 13 of the intermediate tubular section 11.

Summarizing, according to the embodiments of a substructure shown and described in FIG. 1 and FIG. 2, mounting of the wind turbine tower 7 to the mono-pile 1 has been established by providing a top flange 3 on the top of the mono-pile 1 and by providing a corresponding flange 6 at the bottom of the wind turbine tower 7. Holes for bolts 10,14 for mounting the wind turbine tower 7 to the mono-pile 1 or the intermediate structure 11, respectively, are provided in both the top flange 3,13 of the mono-pile 1 or the intermediate structure 11, respectively, and in the flange 6 of the wind turbine tower 1.

The secondary structure 5 may be incorporated by a main section of the secondary structure also having a flange 4, the circumference of which corresponds to the top flange 3 of the mono-pile 1 and to the flange 6 of the wind turbine tower 7. Alternatively, the circumference of the flange 4 corresponds to the flange 21 of the intermediate tubular section 11. The possible flange 4 of the secondary structure 5 is provided with holes through which the bolts will pass between the mono-pile 1 and the wind turbine tower 7.

Alternatively, the secondary structure may be incorporated by a main section of the secondary structure having other support elements than a flange, e.g. diagonally extending beams. The other support elements of the secondary structure are supported on the flange of the mono-pile at locations where bolts between the top flange of the mono-pile and the bottom flange of the wind turbine tower are not passing, the bolts thus passing by the other support elements of the secondary structure.

Even in the alternative, the secondary structure may be supported by the substructure by means of an intermediate tubular section 11 having a bottom flange 12 and a top flange 13, the circumferences of which correspond to the top flange 3 of the mono-pile 1 and to the bottom flange 6 of the wind turbine tower 7, respectively. The flanges 12,13 of the intermediate tubular section 11 are provided with holes through which bolts 14 between the top flange 3 of the mono-pile 1 and the bottom flange 12 of the intermediate tubular section 11 and bolts 15 between the top flange 13 of the intermediate tubular section 11 and the bottom flange 6 of the wind turbine tower 7, respectively, will pass.

All attachments to the substructure, e.g. boat-landings, access ladders, platforms, J/I-tubes, cathodic protection system, etc. may be fixed on a support frame being part of the secondary structure which may be installed in one lift to the mono-pile substructure after driving or vibrating. The boat-landing fender tubes and J/I-tubes are an integrated part of the secondary structure.

The support frame constituting part of the secondary structure is fixed either to an intermediate flange 4 between the wind turbine tower 7 and mono-pile 1 or to an intermediate tubular section 11 with a bottom flange 12 connection for the substructure and a top flange 13 connection for the wind turbine tower 7.

All of the above-mentioned embodiments ensure that the primary structure may be void of any bolted, riveted, welded or other fixation elements such as doubler plates or the like, for mounting the secondary structure to the primary structure. Thus, any mechanical working, e.g. hole-drilling, and any material bonding (grouting not included) such as welding, of the primary structure is eliminated or at least reduced to an absolute minimum.

In the following, elements other than flanges 3,4,12,13 of the mono-pile 1 and of the secondary structure 5 and of the intermediate tubular section 11 are described for establishing a substructure, where the primary structure may still be void of any, e.g. welded, fixation elements such as doubler plates or the like, for mounting the secondary structure to the primary structure.

In the embodiments shown in FIG. 1 and FIG. 2, the secondary structure 5 is shown as having an outer access platform 8 and an inner service platform 9. The secondary structure 5 is also shown having so-called I-tubes and J-tubes for passing electrical cables from the wind turbine and down along the substructure. In case the substructure is established at sea, the secondary structure will also have boat landings and thus function as mooring structure for service ships or other sea vessels loading and/or unloading service personnel and service equipment for the wind turbine during the operational lifetime of the wind turbine.

Especially in such a case, where the secondary structure also has boat landings and thus functions as a mooring structure, the secondary structure 5 may be provided with load-absorbing elements positioned between the mono-pile 1 and the secondary structure 5. In the embodiments shown, the load-absorbing elements are rollers 16 made of an elastomeric material such as rubber or other suitable material.

The rollers 16 are positioned within a gap between the outer circumference 17 of the mono-pile 1 and a section 5A forming an inner circumference 18 of the secondary structure 5, and which section 5A forming an inner circumference 18 of the secondary structure 5 are extending along the upwards extending part 1A of the mono-pile 1. Due to the rollers 16, the gap 19 between the mono-pile 1 and the secondary structure 5 may have a magnitude much larger than that which is normally used.

Thus, the gap 19 may have an extension measured radially from the outer circumference 17 of the mono-pile 1 of at least 50 mm, preferably at least 100 mm, possibly at least 150 mm. The risk of damage to a coating such as anti-corrosive paint of the mono-pile 1 and/or a coating such as anti-corrosive paint of the secondary structure 5, due to possible scratching between the two structures, is thus eliminated when installing the secondary structure along the mono-pile.

Alternatively, the load-absorbing elements may be pads of any shape, beads of any shape, O-ring sealing, labial sealing or other elements protruding in a gap between the mono-pile and the secondary structure. Still, the load absorbing elements are preferably made of rubber or other elastomeric material.

However, the elements are alternatively not load-bearing as such and may be made of a non-elastomeric material, but a material still being capable of reducing friction between the mono-pile and the secondary structure such as PUR, nylon or other friction-reducing material.

Generally in all cases of establishing the substructure, and not only in cases where the secondary structure may serve as a mooring structure, friction-reducing elements are preferred because the risk of damage to a coating such as anti-corrosive paint of the mono-pile and/or a coating such as anti-corrosive paint of the secondary structure, due to possible scratching between the two structures, is thus eliminated when installing the secondary structure along the mono-pile.

Even in the alternative, the load-absorbing elements and the friction-reducing elements are omitted. Instead, fixation elements are used for fixing the secondary structure to the mono-pile, also between sections of the two structures other than at the top of the mono-pile. Such other fixation means could be bolts and nuts, which however may be damaged or may even rupture during impact to the secondary structure of high sea or by boats, in case the substructure is established at sea. Instead of, for example, bolts and nuts, the fixation means may be a clamp (not shown).

As mentioned above, a gap 19 being larger than what has hitherto been used may have been established during installation of the secondary structure along the mono-pile in order to avoid that the secondary structure scratches the coating of the mono-pile during installation. In a specific embodiment, before or after installation of the secondary structure, a clamp is provided around at least part of the secondary structure, and the clamp is subsequently tightened. Tightening of a clamp reduces and finally closes any gap 16 between the outer circumference 17 of the mono-pile 1 and the section 5A forming an inner circumference 18 of the secondary structure 5, thus finally fixing the secondary structure to the mono-pile, also between sections of the two structures other than at the top of the mono-pile.

Still even in the alternative, the load-absorbing elements and the friction-reducing elements are omitted and instead grouting is used for fixing the secondary structure to the mono-pile, also between sections of the two structures other than at the top of the mono-pile. Such grouting may be poured into the gap 19 between the outer circumference 17 of the mono-pile 1 and elements of the secondary structure 5 forming an inner circumference 18 of the secondary structure 5, and the grouting may cure, even below sea level 2A if choosing the right kind of grouting.

The preferred provision of rollers as load-absorbing elements compared to friction-reducing pads, beads or the like, has the benefit of almost eliminating friction between coating on metal of the mono-pile and coating on the secondary structure, when lowering the secondary structure along the mono-pile.

Thus, when lowering the secondary structure along the mono-pile during establishment of the substructure, damage of coating will not occur, neither damage to the coating of the mono-pile nor damage to the coating of the secondary structure. The non-occurrence of damage to coating of the mono-pile and to the coating of the secondary structure eliminates, or least reduces, any corrosion of the metal.

Only horizontal forces are supported by the elastic rollers on the lower part of the secondary structure. Vertical forces are taken by the intermediate flange 4 and/or the flange 21 of the intermediate tubular section 11 (see FIG. 2). The design of the lower fixation makes installation possible without having to use divers, which is expensive.

No Stress Concentration Factors (SCFs) have to be applied for the design of the mono-pile due to no need for welded doubler plates. This may result in using a thinner wall thickness of the mono-pile.

Manufacturing tolerances (out of roundness) are compensated by the elasticity of the load-bearing rollers, the friction-reducing pads or the like or the grouting material poured in the gap and allowed to cure. Vertical tolerances are of no interest as the secondary structure is suspended from either the intermediate flange (see FIG. 1) or from the intermediate tubular section (see FIG. 2).

However, in order to eliminate possible additional risk of corrosion due to the mono-pile and the I-tubes and J-tubes and possible other elements of the secondary structure being submerged in the seawater, either cathodic protection in the shape of sacrificial anodes 20 as shown and/or an impressed current, may be provided together with the load-bearing and at least friction-reducing elements.

The invention claimed is:

1. A method for installing a wind turbine, comprising:
    establishing a substructure in the ground for the wind turbine, the substructure comprising at least one pile extending upwards from the ground or from a foundation for the substructure and having a top end, the top end configured to have a wind turbine tower mounted thereon, the at least one pile being part of a primary structure of the substructure for performing load-bearing of the wind turbine itself,
    establishing a secondary structure of the substructure about an upper section of the at least one pile such that the secondary structure extends downwardly from the top end of the at least one pile towards the ground or the foundation, the secondary structure not performing load-bearing of the wind turbine itself,
    establishing a support of the secondary structure by the at least one pile such that the at least one pile vertically supports the secondary structure,
    mounting fittings to the secondary structure, and
    not mounting fittings to at least one pile being part of the primary structure,
    wherein the secondary structure is intended for being supported on the at least one pile being part of the primary structure along a top flange of the at least one pile and along a support flange of the secondary structure,
    wherein the support flange of the secondary structure is lowered towards and is supported by the top flange of the at least one pile being part of the primary structure,
    wherein the wind turbine tower is subsequently lowered towards the support flange of the secondary structure and is mounted to the substructure by securing a bottom flange of the wind turbine tower to the top flange of the at least one pile, and
    wherein the support flange of the secondary structure, during mounting of the wind turbine tower to the at least one pile, is located intermediate the top flange of the at least one pile and the bottom flange of the wind turbine tower.

2. A method for installing a wind turbine, comprising:
    establishing a substructure in the ground for the wind turbine, the substructure comprising at least one pile extending upwards from the ground or from a foundation for the substructure and having a top end, the top end configured to have a wind turbine tower mounted thereon, the at least one pile being part of a primary structure of the substructure for performing load-bearing of the wind turbine itself,
    sliding a secondary structure over the top end of the at least one pile so that the secondary structure is vertically supported by the top end of the at least one pile and extends downwardly from the top end of the at least one pile towards the ground or the foundation about an upper section of the at least one pile such that there is a gap between an outer circumference of the at least one pile and an inner circumference of the secondary structure, the secondary structure not performing load-bearing of the wind turbine itself,
    laterally supporting the secondary structure about the upper section of the at least one pile by locating supporting elements in the gap between the at least one pile and the secondary structure,
    mounting fittings to the secondary structure, the mounting of fittings to the secondary structure being established by mechanical working, and
    mounting the wind turbine tower to the top end of the at least one pile being part of the primary structure, and the secondary structure constituting an intermediate structure between the at least one pile and the wind turbine tower,
    wherein the secondary structure is intended for being supported on the at least one pile being part of the primary structure along a top flange of the at least one pile and along a support flange of the secondary structure,
    wherein the support flange of the secondary structure is lowered towards and is supported by the top flange of the at least one pile being part of the primary structure,
    wherein the wind turbine tower is subsequently lowered towards the support flange of the secondary structure and is mounted to the substructure by securing a bottom flange of the wind turbine tower to the top flange of the at least one pile, and
    wherein the support flange of the secondary structure, during mounting of the wind turbine tower to the at least one pile, is located intermediate the top flange of the at least one pile and the bottom flange of the wind turbine tower.

3. A method for installing a wind turbine, comprising;
    establishing a substructure in the ground for the wind turbine, the substructure comprising at least one pile extending upwards from the ground or from a foundation for the substructure and having a top end, the top end configured to have an intermediate tubular section mounted thereon, the at least one pile being part of a primary structure of the substructure for performing load-bearing of the wind turbine itself,
    providing at least one intermediate tubular section separate from the at least one pile, the at least one intermediate tubular section having a top end configured to have a wind turbine tower mounted thereon, the at least one intermediate tubular section being part of the primary structure,
    mounting a secondary structure to the at least one intermediate tubular section, the secondary structure not performing load-bearing of the wind turbine itself, and the mounting of the secondary structure to the at least one intermediate tubular section being established by mechanical working,
    lowering the at least one intermediate tubular section towards the at least one pile, the lowering of the at least one intermediate tubular section being terminated by vertically supporting the at least one intermediate tubular section by the top end of the at least one pile, wherein when the secondary structure is mounted to the at least one intermediate tubular section and the at least one intermediate tubular section is being vertically supported by the top end of the at least one pile, the secondary structure extends downwardly from the top end of the at least one pile towards the ground or the foundation and about an upper section of the at least one pile, and mounting the wind turbine tower to the at least one intermediate tubular section, wherein the at least one intermediate tubular section is intended for being supported on the at least one pile being part of the primary structure along a top flange of the at least one pile and along a bottom flange of the at least one intermediate tubular section, wherein the bottom flange of the at least one intermediate tubular section is lowered towards and is supported by the top flange of the at least one pile being part of the primary structure, wherein the wind turbine tower is intended for being supported on the at least one intermediate tubular section along a top flange of the at least one intermediate tubular section and along a bottom flange of the wind turbine tower, and wherein the wind turbine tower is subsequently lowered towards the top flange of the at least one intermediate tubular section and is mounted to the substructure by securing the bottom flange of the wind turbine tower to the top flange of the at least one intermediate tubular section.

4. The method according to claim 2:
where the mounting of the secondary structure furthermore being accomplished by securing at least a part of the secondary structure to the upper section of the at least one pile.

5. The method according to claim 4, where the sliding is established along with friction-reducing elements between at least part of the outer circumference of the at least one pile and at least part of the inner circumference provided by elements of the secondary structure.

6. The method according to claim 5, where the provision of friction-reducing elements is established by a plurality of substantially elastomeric elements extending between at least part of the outer circumference of the at least one pile and at least part of the inner circumference of the elements of the secondary structure, and the friction-reducing elements being in sliding abutment with, at least part of the outer circumference of the at least one pile.

7. The method according to claim 5, where the provision of friction-reducing members is established by a plurality of substantially rigid elements extending between at least part of the outer circumference of the at least one pile and at least part of the inner circumference of the elements of the secondary structure, and the friction-reducing elements being in sliding abutment with, at least part of the outer circumference of the at least one pile.

8. The method according to claim 5, where the provision of friction-reducing elements is established by providing a number of substantially vertically rolling elements extending between at least part of the outer circumference of the at least one pile and at least part of the inner circumference of the elements of the secondary structure, and the friction-reducing elements being in sliding abutment with, at least part of the outer circumference of the at least one pile.

9. The method according to claim 5, where the provision of friction-reducing elements is established by providing a number of beads or labial-like elements or tongue-like elements extending between at least part of the outer circumference of the at least one pile and at least part of the inner circumference of the elements of the secondary structure, and the friction-reducing elements being in sliding abutment with, at least part of the outer circumference of the at least one pile.

10. The method according to claim 4, where the section of secondary structure being slid along the at least one pile being part of the primary structure, is subsequently secured to the at least one pile, the securing being established by clamping the inner circumference of the secondary structure around the outer circumference of the at least one pile.

11. A substructure for a wind turbine, comprising:
at least one pile extending upwards from the ground or from a foundation for the at least one pile or from another part of the substructure that is grounded and having a top end, the top end configured to have a wind turbine tower mounted thereon, said at least one pile being part of a primary structure of the substructure for performing load-bearing of the wind turbine itself, a secondary structure at least partly surrounding the at least one pile along an upper section of the at least one pile such that the secondary structure extends downwardly from the top end of the at least one pile towards the ground or the foundation, said secondary structure not performing load-bearing of the wind turbine itself, and said secondary structure comprising a support element for supporting the secondary structure to the at least one pile such that the at least one pile vertically supports the secondary structure, and fittings for mounting additional structures to the substructure, and where at least most of said fittings are attached to the secondary structure by means of mechanical fastening or by means of material bonding, wherein the support element of the secondary structure is a flange, and where said flange extends between a top flange of the at least one pile and a bottom flange of the wind turbine tower, said flange of the secondary structure being positioned intermediate the top flange of the at least one pile and the bottom flange of the wind turbine tower, when the wind turbine tower is mounted to the substructure.

12. The substructure according to claim 11, where the substructure comprises at least one of the following: a mono-pile or a plurality of piles.

13. The substructure according to claim 11, where the substructure comprises at least one of the following: a hollow tubular pile, or a solid pile.

14. A substructure for a wind turbine, comprising:
at least one pile extending upwards from the ground or from a foundation for the at least one pile or from another part of the substructure that is grounded and having a top end, the top end configured to have a wind turbine tower mounted thereon, said at least one pile being part of a primary structure of the substructure for performing load-bearing of the wind turbine itself, a secondary structure at least partly surrounding the at least one pile along an upper section of the at least one pile such that the secondary structure extends downwardly from the top end of the at least one pile towards the ground or the foundation, said secondary structure not performing load-bearing of the wind turbine itself, and said secondary structure comprising a support element for supporting the secondary structure to the at least one pile such that the at least one pile vertically supports the secondary structure, and fittings for mounting additional structures to the substructure, and where at least most of said fittings are attached to the secondary structure by means of mechanical fastening or by means of material bonding, where the support element of the secondary structure is at least one intermediate tubular section, said at least one intermediate tubular section extending between the at least one pile and the wind turbine tower, when the wind turbine tower is mounted to the substructure, and where the at least one intermediate tubular section has a bottom flange being mounted to a top flange of the at least one pile, and where the at least one intermediate tubular section also has a top flange onto which a bottom flange of the wind turbine tower is mounted, when the wind turbine tower is mounted to the substructure.

15. The substructure according to claim 11, where at least a section of the secondary structure includes an inner circumference and extends downwards along an upper section of the at least one pile of the substructure, and where the section of the secondary structure by means of laterally supporting elements is supported laterally on an outer circumference of the at least one pile, said laterally supporting elements constituting friction-reducing elements between the downwards extending section of the secondary structure and the upper section of the at least one pile.

16. The substructure according to claim 15, where the friction-reducing elements are a plurality of substantially elastomeric elements extending between at least part of the outer circumference of the at least one pile and at least part of the inner circumference of the secondary structure.

17. The substructure according to claim 15, where the friction-reducing elements are a plurality of substantially rigid elements extending between at least part of the outer circumference of the at least one pile and at least part of the inner circumference of the secondary structure.

18. The substructure according to claim 15, where the friction-reducing elements are a plurality of substantially vertically rolling elements extending between at least part of the outer circumference of the at least one pile and at least part of the inner circumference of the secondary structure.

19. The substructure according to claim 15, where the friction-reducing elements are a plurality of beads or labial-like elements or tongue-like elements extending between at least part of the outer circumference of the at least one pile and at least part of the inner circumference of the secondary structure.

20. A wind turbine comprising a substructure and a wind turbine tower mounted on said substructure, said substructure comprising:
at least one pile extending upwards from the ground or from another part of the substructure that is grounded and having a top end, the top end configured to have the wind turbine tower mounted thereon, said at least one pile being part of a primary structure of the substructure for performing load-bearing of the wind turbine itself,
a secondary structure at least partly surrounding the at least one pile along an upper section of the at least one pile such that the secondary structure extends downwardly from the top end of the at least one pile towards the ground, said secondary structure not performing load-bearing of the wind turbine itself, and said secondary structure comprising a support element for mounting the secondary structure to the at least one pile such that the at least one pile vertically supports the secondary structure, and
fittings for mounting additional structures to the substructure, all of said fittings being attached to the secondary structure by means of mechanical fastening or by means of material bonding,
wherein the support element of the secondary structure is a flange, and where said flange extends between a top flange of the at least one pile and a bottom flange of the wind turbine tower, said flange of the secondary structure being positioned intermediate the top flange of the at least one pile and the bottom flange of the wind turbine tower, when the wind turbine tower is mounted to the substructure.

21. The wind turbine according to claim 20, where the substructure comprises at least one of the following : a mono-pile or a plurality of piles.

22. The wind turbine according to claim 20, where the substructure comprises at least one of the following : a hollow tubular pile, or a solid pile.

23. The method according to claim 2, where the mounting of fittings to the secondary structure is established by welding or bolting.

24. The method according to claim 1, where not mounting fittings to the at least one pile further comprises not mounting fittings to the at least one pile by mechanical fixation or thermally induced material bonding of the at least one pile.

25. The substructure according to claim 11, where all of said fittings are attached to the secondary structure by means of mechanical fastening or by means of material bonding.

26. The substructure according to claim 13, where the hollow tubular pile is made from steel.

27. The substructure according to claim 13, where the solid pile is made from concrete.

28. The wind turbine according to claim 22, where the hollow tubular pile is made from steel.

29. The wind turbine according to claim 22, where the solid pile is made from concrete.

30. A wind power installation, comprising:
a grounded substructure; and
a wind turbine mounted to the substructure and including a wind turbine tower,
wherein the substructure comprises:
at least one pile extending upwards away from the ground and having a top end, the top end having the wind turbine mounted thereon, the at least one pile being part of a primary structure of the substructure for performing load-bearing of the wind turbine itself;
a secondary structure telescopingly received over an upper section of the at least one pile and vertically supported at a support element by the top end of the at least one pile such that the secondary structure extends downwardly from the top end of the at least one pile towards the ground and about an upper section of the at least one pile to define a gap between an outer circumference of the at least one pile and an inner circumference of the secondary structure, the secondary structure not performing load-bearing of the wind turbine itself; and
fittings on the secondary structure for mounting additional structures to the substructure,
wherein the support element of the secondary structure is a flange, and where said flange extends between a top flange of the at least one pile and a bottom flange of the wind turbine tower, said flange of the secondary structure being positioned intermediate the top flange of the at least one pile and the bottom flange of the wind turbine tower, when the wind turbine tower is mounted to the substructure.

31. The wind power installation according to claim 30, further comprising supporting elements disposed in the gap between the outer circumference of the least one pile and the inner circumference of the secondary structure, the supporting elements laterally supporting the secondary structure on the outer circumference of the at least one pile.

* * * * *

UNITED STATES PATENT AND TRADEMARK OFFICE
CERTIFICATE OF CORRECTION

| | | |
|---|---|---|
| PATENT NO. | : 9,494,131 B2 | Page 1 of 1 |
| APPLICATION NO. | : 12/675022 | |
| DATED | : November 15, 2016 | |
| INVENTOR(S) | : Torsten Fischer et al. | |

It is certified that error appears in the above-identified patent and that said Letters Patent is hereby corrected as shown below:

On the Title Page

At (73) Assignee, change "Vestas Wind Systems A/S, Aarhus N. (DK)" to --MHI Vestas Offshore Wind A/S, Aarhus (DK)--.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*